United States Patent [19]

Matsumoto

[11] 4,429,884
[45] Feb. 7, 1984

[54] STERN TUBE FACE SEAL WITH FUNNEL-SHAPED PACKING

[75] Inventor: Sotosuke Matsumoto, Kawagoe, Japan

[73] Assignee: Eagle Industry Co., Ltd., Tokyo, Japan

[21] Appl. No.: 473,487

[22] Filed: Mar. 9, 1983

[30] Foreign Application Priority Data

Mar. 17, 1982 [JP] Japan .................................. 57-40728

[51] Int. Cl.³ .............................................. F16J 15/38
[52] U.S. Cl. .................................. 277/93 SD; 277/85; 277/84; 277/92
[58] Field of Search ........................... 277/81 R, 82–85, 277/88, 92, 93 R, 93 SD, 95, 65

[56] References Cited

U.S. PATENT DOCUMENTS

| 2,472,257 | 6/1949 | Matter ................................. 277/84 |
| 2,585,154 | 2/1952 | Montgomery .............. 277/93 R X |
| 2,995,391 | 8/1961 | Snyder .................... 277/93 SD X |
| 3,208,756 | 9/1965 | Clayton ................................ 277/95 |
| 3,452,994 | 7/1969 | Gyory ............................. 277/92 X |
| 3,693,985 | 9/1972 | Dillner .......................... 277/93 R X |

FOREIGN PATENT DOCUMENTS

| 708400 | 4/1965 | Canada ........................... 277/93 SD |
| 933389 | 8/1963 | United Kingdom ............ 277/81 R |

Primary Examiner—Robert S. Ward, Jr.
Attorney, Agent, or Firm—Jordan and Hamburg

[57] ABSTRACT

A stern tube seal wherein a rotatable and slidable ring in close contact and sliding with respect to a fixed slidable ring secured to a stern frame side is loosely slipped over a rotating shaft (stern tube), and a packing having a shape of approximately funnel is interposed between said rotatable and slidable ring and a housing secured to said rotating shaft, whereby relative displacement of said rotating shaft with respect to said stern frame is not propagated to said rotatable and slidable ring by elasticity of said packing.

1 Claim, 4 Drawing Figures

STERN TUBE FACE SEAL WITH FUNNEL-SHAPED PACKING

BACKGROUND OF THE INVENTION

The present invention relates to a stern tube seal of the mechanical type which is used as a stern tube sealing device of ship.

In the past, mounting accuracy of a stern tube of the kind as described greatly varies depending on the condition of goods loaded within a ship or on the movement of ship so as not to be able to sufficiently follow displacement of a rotating shaft (stern tube) with respect to a stern frame (that is, on the hull side), giving rise to a leakage of seal fluid. Accordingly, it has been desired eagerly to enhance the performance of seal.

BRIEF SUMMARY OF INVENTION

In view of the above-described demand, the present invention provides a stern tube seal which can exhibit an excellent following property with respect to the displacement of a rotating shaft in both axial and perpendicular (diametral) directions.

The above-described object is achieved by the present invention wherein an annular housing fitted in a rotating shaft is integrally formed with an axially and rearwardly extending flange, a rotatable and slidable ring having a section of approximately L-shape and having a small diameter portion (an axial portion) at a front end thereof is arranged at an inner peripheral position of said flange, an engaging means to prevent relative movement in a rotating direction is provided between said rotatable and slidable ring and said flange of the housing, said rotatable and slidable ring being biased by a coiled spring axially and frontwardly, and a packing formed of an elastic material such as rubber and having a shape of approximately funnel is interposed between a shoulder portion in the outer periphery of said rotatable and slidable ring and a shoulder portion in the inner periphery of the flange of said housing.

While the present invention has been briefly outlined, the above and other objects and advantages of the present invention will be fully understood by reading the following detailed description setting forth a preferred embodiment of the present invention in connection with the accompanying drawings. It should be noted that the drawings merely illustrate a preferred embodiment for explanation of the present invention and the scope of the present invention is not limited thereby.

DESCRIPTION OF THE PREFERRED EMBODIMENTS

Figure 1:
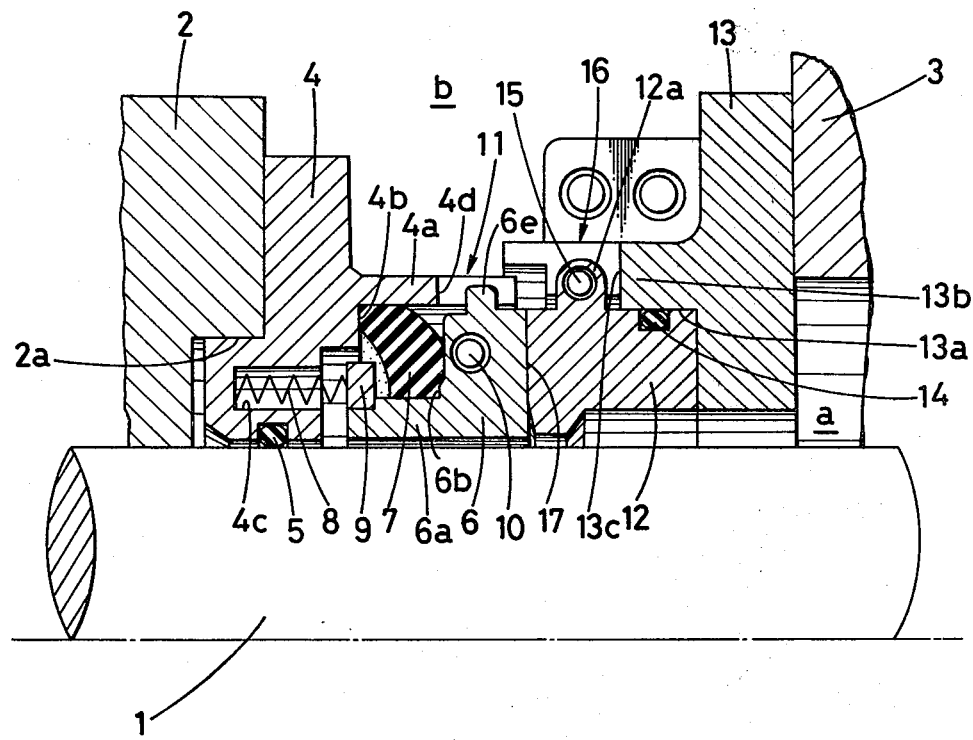
FIG. 1 is a sectional view cutaway in half showing the whole portion of a stern tube seal.

Referring to the drawings, reference numeral 1 designates a rotating shaft (stern tube) having a rotating blade 2 fitted axially and frontwardly (leftwards in the drawing, which is likewise applied hereinafter) thereof, and a stern tube seal is fitted between the rotating blade 2 in the outer periphery of the rotating shaft 1 and a stern frame 3.

Reference numeral 4 designates an annular housing externally slipped over the rotating shaft 1, in which an annular projection formed integral with the front end in an inner peripheral portion thereof is fitted in an annular shoulder 2a of the rotating blade 2 and an O ring 5 is interposed between the housing and the rotating shaft 1, the housing being rotated following the rotating shaft 1. The housing 4 is further integrally formed with an axially and rearwardly extending annular flange 4a. Reference numeral 6 designates a rotatable and slidable ring having a section of approximately L-shape, which can take a splitting type wherein said ring may be split in a circumferential direction as will be described later, and whose small diameter portion (axial portion) 6a is disposed at the front end and is externally slipped over the rotating shaft 1 at the inner peripheral position of a flange 4a of said housing 4. Reference numeral 7 designates a packing formed of an elastic material such as rubber having a shape of approximately funnel, which is interposed between a shoulder 6b in the outer periphery of the rotatable and slidable ring 6 and a shoulder 4b in the inner periphery of a base of the flange 4a of the housing 4. Reference numeral 8 designates a coiled spring interposed between an annular groove 4c formed in the inner peripheral portion of the housing 4 and a retainer ring 9, the required number of coiled springs being disposed circumferentially and equidistantly, and the retainer ring 9 is fitted in a small diameter portion 6a of the rotatable and slidable ring 6 so that said coiled springs 8, 8 . . . bias the rotatable and slidable ring 6 axially and rearwardly.

Figure 2:
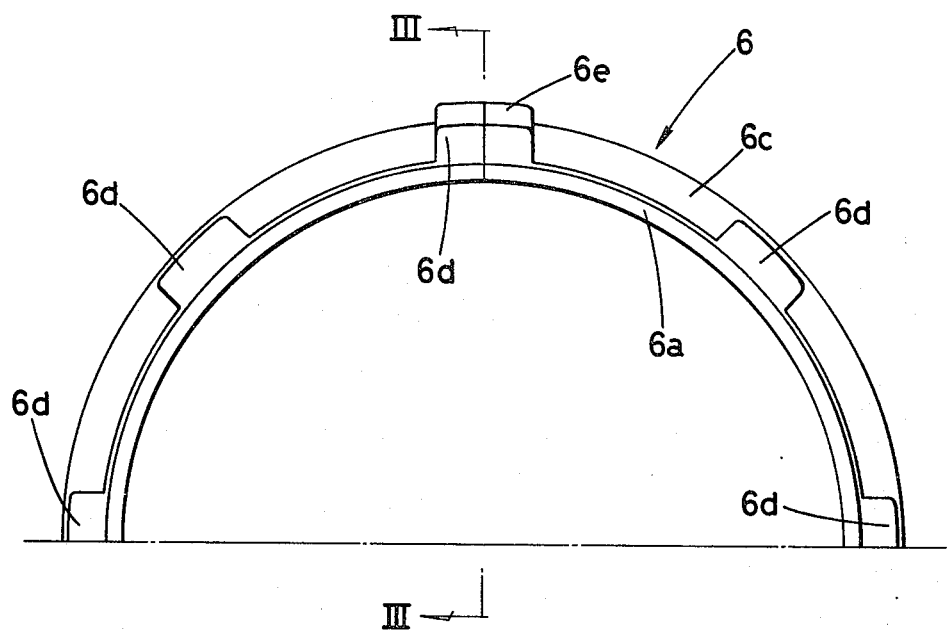
FIG. 2 is a front view cutaway in half showing a rotatable and slidable ring.
Figure 3:
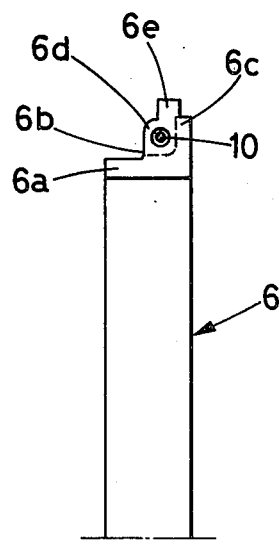
FIG. 3 is a sectional view taken along line III—III of FIG. 2.
Figure 4:
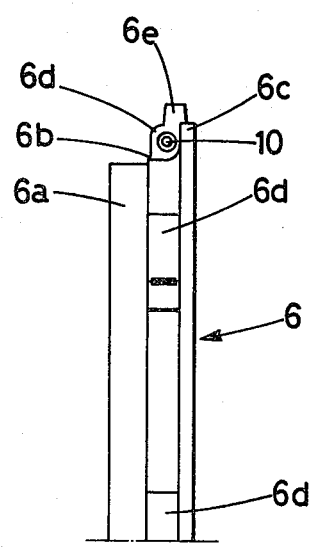
FIG. 4 is a right-hand side view cutaway in half likewise showing the rotatable and slidable ring.

As shown in FIGS. 2 to 4, the aforesaid rotatable and slidable ring 6 can be of the type in which the ring is circumferentially split into two sections, and is integrally formed with bosses 6d, 6d, . . . having a great wall thickness equidistantly disposed (divided equally in eight, in the illustrated embodiment) on the front surface of a large diameter portion (diametral portion) 6c thereof. Two bosses at a symmetrical position by 180 degrees out of these bosses 6d . . . constitute semi-annular joining portions divided in two which are joined by means of a pin 10. The boss 6d corresponding to said joining portion is integrally formed in its outer periphery with an engaging projection 6e further projected outer-peripherally from the outer peripheral surface of the large diameter portion 6c, and said projection 6e engages a groove 4d axially formed at the extreme end of the flange 4a of said housing 4 to form engaging means 11 to impair relative rotational movement of said rotatable and slidable ring 6 and said housing 4.

Reference numeral 12 designates a fixed slidable ring which can be of the type in which said ring is split into two sections, likewise the rotatable and slidable ring 6, and the ring 6 is airtightly fitted through an O ring 14 in an annular shoulder 13 of a further housing 13 fixedly mounted on the sterm frame 3. Reference numeral 12a designates a projection integral with said fixed slidable ring 12, said projection 12 forming a joining portion to fasten a semi-ring divided in two by means of a pin 15. The projection 12 further engages a groove 13c at the extreme end of a flange 13b integrally projected axially and frontwardly from the housing 13 to constitute a further engaging means 16 at said projection. The engaging means 16 is provided to prevent rotation of the fixed slidable ring 12 along with the rotatable and slidable ring 6.

The stern tube seal constructed as described hereinbefore can prevent leak-in of sea water into a machine side (a) and prevent leak-out of oil within the machine outside the machine, in the sealed sliding surface 17 between the rotatable and slidable ring 6 and the fixed slidable ring 12. However, the rotatable and slidable ring 6 is in the state where the former is loosely fitted in the rotating shaft 1 and is indirectly held on the rotating shaft 1 by elasticity of the packing 7 in the shape of approximately funnel formed of an elastic material such as rubber, and therefore, even if the rotating shaft 1 is relatively displaced with respect to the hull such as the stern frame 3 due to the movement of the ship or the like, the rotatable and slidable ring 6 has a sufficient following property thereto, and this following property is effective for displacement in both axial and perpendicular (diametral) directions. Further, since the rotatable and slidable ring 6 is biased by the coiled spring 8 axially and frontwardly, and therefore, the following property with respect to the axial displacement may be obtained even by said coiled spring 8. The coiled spring 8 normally used is formed of metal but the coiled spring is protected from sea water by the packing 7 interposed between the rotatable and slidable ring 6 and the housing 4 in accordance with the above-described construction, and therefore, particular consideration as to the corrosion resistance need not be paid to the coiled spring 8. In addition, there is no possibility of adherence of foreign matter in sea water.

Next, the rotatable and slidable ring 6 integrally formed with the bosses 6d, 6d . . . having a section of approximately L-shape and a great wall thickness on the front surface of the large diameter portion 6c will be described in detail. The rotatable and slidable ring 6 comprises the sealed sliding surface 17 at the end surface on the side of the large diameter portion 6c, as already described. Normally, the aforesaid end surface is subjected to lapping finishing to enhance the surface accuracy thereby enhancing the performance of seal. On the other hand, however, the sealed sliding surface 17 always need be maintained in a good lubricating condition, and if inferior lubrication occurs, a baking wear possibly results. The rotatable and slidable ring 6 constructed as described above is provided to cope therewith. That is, if sliding heat is generated by sliding contact between the rotatable and slidable ring 6 and the fixed slidable ring 12, said heat gradually propagates to the whole rotatable and slidable ring 6. However, since the rotatable and sliding ring 6 is partly formed with the bosses 6d, 6d in a circumferential direction, there gives rise to a slight difference in amount of thermal expansion between a portion provided with the bosses 6d, 6d . . . and a portion not provided with the bosses, to thereby form a slight strain (face strain, that is, undulation) in the end surface which constitutes the sealed sliding surface 17. The rotatable and slidable ring 6 makes use of said strain to facilitate formation of a lubricating fluid film in said portion thereby enhancing the durability and PV value. In accordance with the rotatable and slidable ring 6, there are advantages in that first, since generation of face strain caused by sliding heat is expected before hand, it is not necessary to form said end surface into a complete plane at the initial stage of manufacture, which eliminates the need of lapping at high accuracy to render the manufacture easy and contributes to reduction in cost, and that secondly, accordingly, a large lapping machine is not necessary and therefore, a large seal device above 1,000 $\phi$ becomes possible to be manufactured.

As described above, the present invention can provide a stern tube seal which can exhibit an excellent following property with respect to the displacement of the rotating shaft caused by movement of ship or the like.

While a preferred embodiment of the present invention has been described, it is obvious that many modifications and changes of the present invention may be made without departing the principle thereof. Accordingly, all modifications and changes by which the effects of the present invention may be obtained substantially through the use of substantially identical or corresponding arrangement are understood to be included in the scope of the present invention by the following claim.

What is claimed is:

1. A stern tube seal characterized in that an annular housing fitted in a rotating shaft is integrally formed with an axially and rearwardly extending flange, a rotatable and slidable ring having a section of approximately L-shape and a small diameter portion at a front end thereof is arranged at an inner peripheral position of said flange, said rotatable and slidable ring and said flange of said housing having engaging means to prevent relative movement in a rotating direction, said rotatable and slidable ring is biased by means of coiled springs axially and frontwardly, and a packing having a shape of approximately funnel formed of an elastic material such as rubber is interposed between a shoulder portion in the outer periphery of said rotatable and slidable ring and a shoulder portion in the inner periphery of the flange of said housing.

* * * * *